Figure 1:
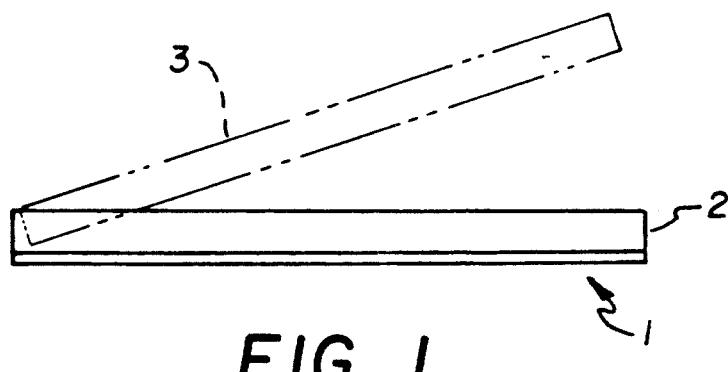

United States Patent
Trumpp

[11] Patent Number: 5,146,484
[45] Date of Patent: Sep. 8, 1992

[54] SHEET-FILM CASSETTE

[75] Inventor: Alfred Trumpp, Stuttgart, Fed. Rep. of Germany

[73] Assignee: Eastman Kodak Company, Rochester, N.Y.

[21] Appl. No.: 646,599

[22] PCT Filed: Aug. 28, 1989

[86] PCT No.: PCT/EP89/01009
§ 371 Date: Jan. 28, 1991
§ 102(e) Date: Jan. 28, 1991

[87] PCT Pub. No.: WO90/02356
PCT Pub. Date: Mar. 8, 1990

[30] Foreign Application Priority Data
Aug. 30, 1988 [DE] Fed. Rep. of Germany ..... 38293137

[51] Int. Cl.$^5$ ............................................. G03B 42/04
[52] U.S. Cl. ..................................... 378/188; 378/187
[58] Field of Search ......................... 378/188, 187, 185

[56] References Cited
U.S. PATENT DOCUMENTS
4,637,043  1/1987  Bauer ................................... 378/188
5,086,446  2/1992  Bauer et al. ......................... 378/188

*Primary Examiner*—Craig E. Church
*Attorney, Agent, or Firm*—Frank Pincelli

[57] ABSTRACT

A sheet-film cassette (1) comprises a lower portion (2) and a lid (3) hinged to said lower portion by means of a hinge (4). Hinge (4) consists of a flexible material and has a ledge-shaped profile with a thinner portion of the material forming a pivot zone (4e). Holding elements (4a, 4b and 4f, 4h respectively) which extend on either side of said pivot zone (4i) across the total length of the hinge are arranged for mounting the lower portion (2, 2f) and the lid (3, 3c) respectively. In order that a uniform pressure be exerted on the film, additional support means (4d, 4f) are molded to hinge (4), said support means being brought into positive engagement when cassette (1) is closed and stabilizing the total area of the hinge. For this purpose a ledge (4f) associated with the lower portion (2) is molded to hinge (4), which ledge extends across the whole length of the hinge into the interior of the cassette. When cassette (1) is in its closed condition, this ledge is positively engaged by a ledge (4d) associated with lid (3) and molded to hinge (4).

The ledges (4d) and (4f) as well as a projection (4j) extending into a recess (4k), which are also molded to hinge (4), extend over the total length of hinge (4) so that the hinge is sealed to prevent light from entering when cassette (1) is in its closed condition.

8 Claims, 2 Drawing Sheets

SHEET-FILM CASSETTE

DESCRIPTION

The invention relates to a sheet-film cassette comprising a lower cassette portion serving to position the sheet film, an upper cassette portion forming the cassette lid and including sheet-film pressure means, a narrow side wall connected to said lower portion, said upper cassette portion being held to said side wall, and thereby to said lower cassette portion, by a hinge, said hinge extending in a direction parallel to said side wall and having a surface aligned with the outer surface of said side wall, one part of the hinge being connected to the side wall, a second part of the hinge being connected to the upper cassette portion, the cassette also having a closing device which is arranged on the side of the cassette opposite to said hinge, the hinge further comprising a first projection, which extends from the part of the hinge connected to the side wall in a direction parallel with the hinge and projects into the interior of the cassette, a second projection which extends from the part of the hinge connected to the upper cassette portion in a direction parallel with the first projection and projects into the interior of the cassette.

In a cassette of this type which has been disclosed in DE-C1-34 01 577 the cassette lid is hinged to the lower cassette portion by a hinge made of flexible material and comprising a pivot zone formed by a thinned section and having two claw-like holding elements to connect the cassette portions.

According to another cassette (PCT-A1-WO 82/00900) the cassette lid is hinged to the lower cassette portion by a plastic hinge, a flexible pivot zone being formed by a thinned section of the material at the hinge. The hinge is fastened to a thin wall of the lower cassette portion which in a manner known per se serves for positioning the cassette and for moving an X-ray film into close contact with a portion adapted to receive said film.

As a result of the thin wall of these cassettes and the thinned flexible zone of their hinges, the stability of these cassettes in the area of the hinge is reduced so that uniform contact pressure of the film cannot be guaranteed.

It is the object of the invention to provide a sheet-film cassette of the generic type such that in the area of the cassette hinge, too, a uniform contact pressure by a cassette lid on the film is reached over the whole length of the hinge.

In accordance with the invention this object is attained in that when the cassette is closed the second projection engages the first projection from below, whereby the projections support each other.

Avantageously, the hinge consists of a flexible material and has a ledge-shaped profile with a pivot zone formed by a thinned section of the material. Holding elements extending in the longitudinal direction on either side of said pivot zone are provided for the cassette portions as well as for the projections required for the support according to the invention and for further elements provided for light-sealing purposes.

As a result of the design of the sheet-film cassette according to the invention, the cassette, which is unstable in the area of the thin wall and the pivot zone of the hinge when in its open position, is stabilized when the cassette is closed. Thus the cassette lid and its pressure means respectively can exert uniform pressure on the film across the whole length of the hinge.

Further features and advantages can be inferred from the description of an embodiment of the invention illustrated in the drawings and from the subclaims.

The drawings show schematically in

Figure 2:
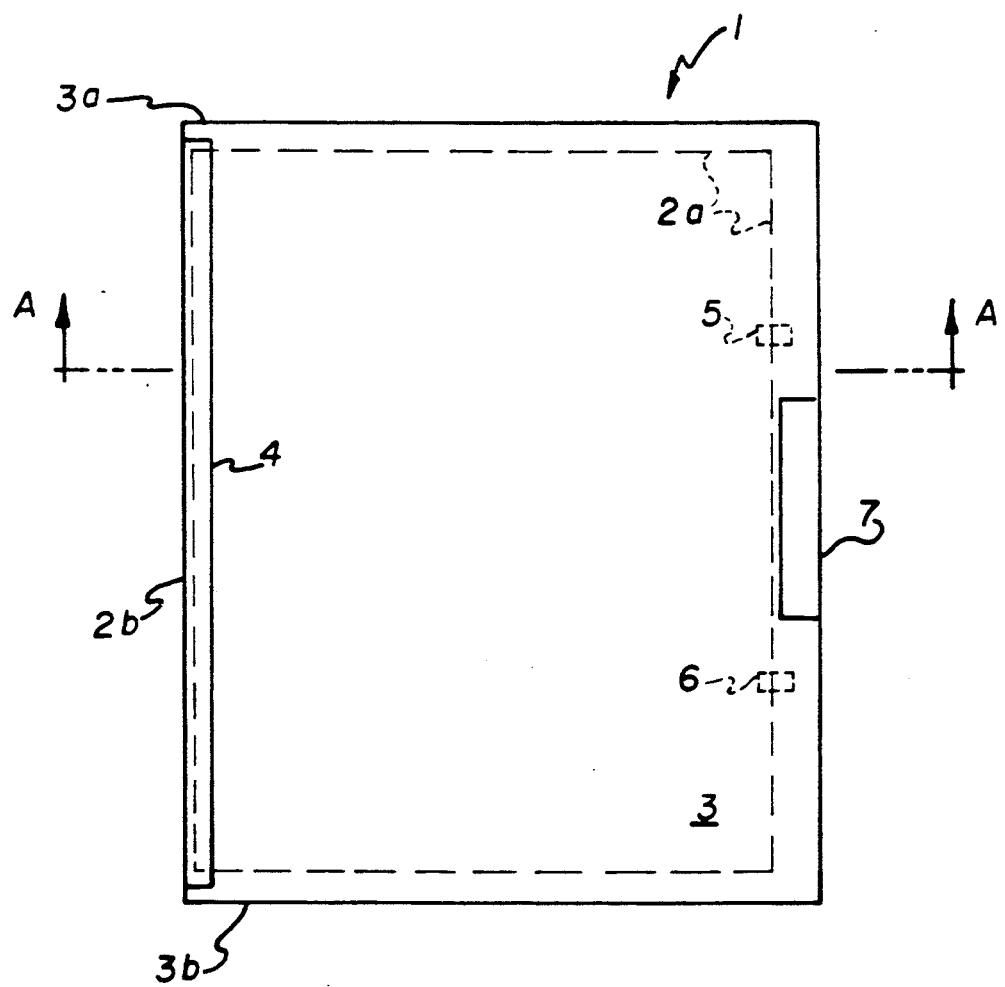

FIG. 1 a lateral view of a sheet-film cassette;

FIG. 2 a plan view of the cassette according to FIG. 1, and

Figure 3:
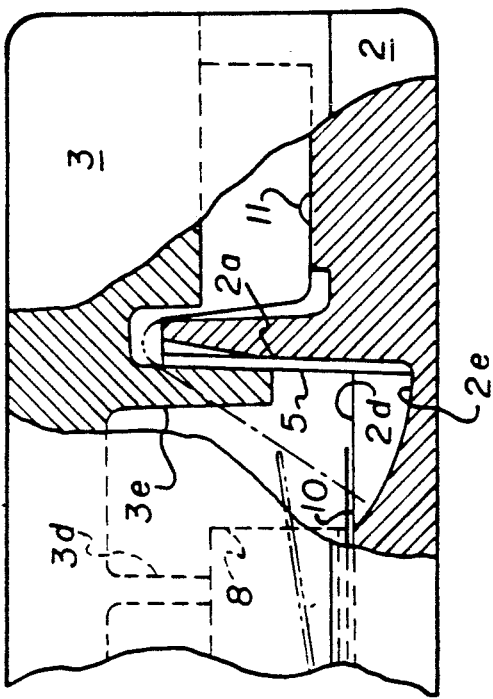
Figure 3:
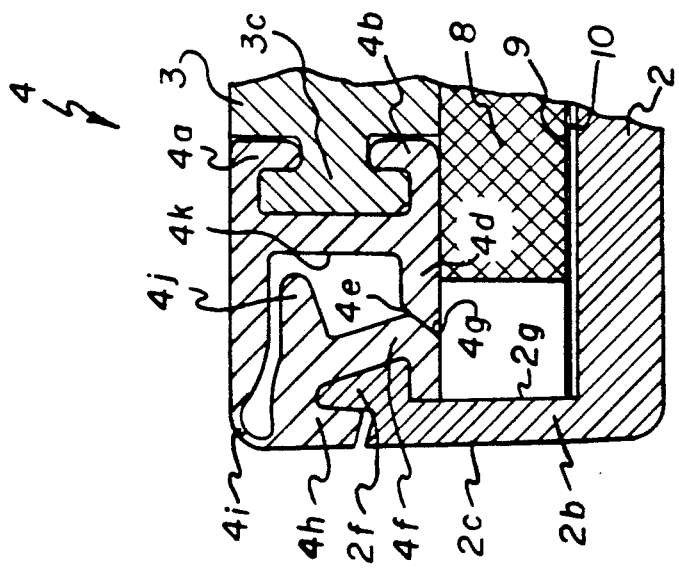

FIG. 3 a sectional view along line A—A in FIG. 2, with only the essential areas illustrated and shown in section respectively.

The invention will be described with reference to an X-ray sheet-film cassette which is preferably used for mamographic purposes and to this end is designed with a relatively thin end wall so that the Xray film can be moved as closely as possible to the body.

The cassette 1 comprises a lower portion 2 to which a lid 3 is hinged by means of a hinge 4.

Lid 3 can be locked with a lower portion 2 of cassette 1 by means of a closing device 7 of a type known per se and not illustrated in detail, which can be actuated either automatically or manually.

The lower portion 2 of cassette 1 has a support surface 2d for a sheet film 10, said support surface being surrounded by a circumferential wall 2a, 2b of which wall portion 2b is thin and directly forms the outer wall of a narrow side of cassette 1.

Two spring elements 5, 6 are mounted to the lower portion 2 in a position opposite to the thin wall 2b (FIG. 2) by hot rivets 11 with a slight pretention. As illustrated in FIG. 3, the free ends of the spring elements 5, 6 extend into the closed receiving space for the sheet film 10 and into recesses 2e of the support surface 2d.

Hinge 4 by which the lower portion 2 and the lid 3 are pivotably connected consists of a flexible material and, as shown in FIG. 3, has a ledge-shaped profile with a thinned section which forms a pivot zone 4i. Holding elements extending over the whole length of the hinge are molded on either side of said pivot zone 4i for mounting the lower portion 2 and the lid 3 respectively. On the side of the lid, these holding elements are formed by ledges 4a, 4b which enclose in a clawlike manner a T-shaped end section 3c of lid 3.

Ledges 4f and 4h molded to hinge 4 also enclose also in a clawlike manner a beadlike portion 2f of thin wall 2b of lower portion 2.

As can be seen from FIG. 3, when the cassette 1 is closed, the area of the hinge is stabilized by a ledge 4d associated with lid 3, said ledge having an inclined surface 4e which positively engages below an inclined surface 4g of ledge 4f which is associated with the thin wall 2b.

The ledges 4d and 4f and a projection 4j extending into a recess 4k, which are also molded on hinge 4, extend over the total length of hinge 4 so that the hinge is protected against the entrance of light when cassette 1 is closed. The end sides of hinge 4 are, moreover, covered by lateral projections 3a and 3b of lid 3 (see FIG. 2) as well as by intermediate labyrinth-type webs (not illustrated) on the lower portion 2 and are thus sealed against the entrance of light.

Hinge 4 does not project beyond the plane of the outer surface 2c of the lower portion 2. Hinge 4 is fastened on the lower portion 2 and on lid 3 by plugging and/or snapping.

At the inner side of lid 3, film pressure means of a type known per se are provided, said means comprising a foamed-plastic plate 8 and an intensifying screen 9 arranged thereon and extending directly up to the inner surface 2g of the thin wall 2b.

The foamed-plastic plate 8 is mounted on the inner side of lid 3, which is not shown in detail, and is reinforced by ribs 3d arranged in a grid pattern.

Outside the range of the hinge, the lower portion 2 and the lid 3 of cassette 1 are provided with walls interlocking in a known labyrinth-type configuration not illustrated to prevent light from entering the cassette. When lid 3 is closed, one of those walls 3e arranged on lid 3 (see FIG. 3) extends into the range of pivotal movement of the spring elements 5 and 6 and displaces said elements laterally.

When a sheet film 10 is loaded into the open cassette 1, the obliquely positioned spring elements 5, 6 (shown in dash-dotted lines) direct the sheet film 10 into the receiving chamber of the cassette 1 such that its front edge is moved into direct contact with the inner surface 2g of thin wall 2b.

When sheet film 10 is in its loaded position, its rear edge assumes a slightly elevated position as shown in dash-dotted lines in FIG. 3. This ensures that the spring elements 5, 6 can always carry out their guiding function independently of the dimensional tolerances of the film.

The sheet film 10 having been loaded, lid 3 is closed. During such operation ledge 4d associated with lid 3 moves below ledge 4f associated with the thin wall 2b of lower portion 2 so that the inclined surfaces 4e and 4g of said ledges are brought into positive engagement.

As a result, lid 3 is reliably supported and the whole area of the hinge is stabilized so that lid 3 exerts uniform pressure over the total width of the cassette.

During closing of lid 3, the inclined surface 4g of ledge 4f acts on the inclined surface 4e of ledge 4d to press lid 3 together with foamed-plastic plate 8 and intensifying screen 9 onto sheet film 10 placed in lower portion 2, 2d. The relatively high initial pressure results in the intimate contact required between intensifying screen 9 and sheet film 10. The rolling effect between sheet film 10 and pressure means 8 and 9 initiated during closing of the lid 3—and subjecting the surface to low pressure—is continued due to a slightly curved design of the inner side of lid 3 (not illustrated) and a slightly drum-shaped design of the support surface 2d in the lower portion 2 (not illustrated either) until cassette 1 is closed. Thanks to the rolling effect during closing of cassette 1, air cannot be entrapped between sheet film 10 and its contact surfaces 2d and 9.

Shortly before lid 3 reaches its closing position, the spring elements 5, 6, which are not used any longer, are pushed aside by the wall 3e of the lid so that the sheet film 10 can assume a perfectly plane position also in this area when cassette 1 is closed.

In contrast to the illustrated embodiment one of the longer sides of the hinge can also be molded directly to the lid or to the lower portion. Moreover, it is possible for the lower portion, the hinge and the lid to form an integral unit (not illustrated).

Another modification of the illustrated embodiment may consist in that (not illustrated) one or both support ledges 4d, 4f form part of lower portion 2 and cassette lid 3 respectively, with the hinge 4 otherwise designed in the described manner or in another manner known per se.

The design of the hinge area according to the invention is advantageous not only for a cassette as shown in the embodiment but also for a cassette in which the hinge area must be stabilized in order to attain smaller cassette dimensions.

I claim:

1. Sheet-film cassette (1) comprising a lower cassette portion (2) serving to position the sheet film (10), an upper cassette portion (3) forming the cassette lid and including sheet-film pressure means (8), a narrow side wall (2b) connected to said lower portion (2), said upper cassette portion (3) being held to said side wall (2b), and thereby to said lower cassette portion (2), by a hinge (4), said hinge (4) extending in a direction parallel to said side wall (2b) and having a surface aligned with the outer surface (2c) of said side wall (2b), one part of the hinge being connected to the side wall, a second part of the hinge being connected to the upper cassette portion, the cassette (1) also having a closing device (7) which is arranged on the side of the cassette opposite to said hinge (4), the hinge (4) further comprising a first projection (4f), which extends from the part of the hinge (4) connected to the side wall (2b) in a direction parallel with the hinge (4) and projects into the interior of the cassette, a second projection (4d) which extends from the part of the hinge (4) connected to the upper cassette portion (3) in a direction parallel with the first projection (4f) and projects into the interior of the cassette, characterized in that when the cassette is closed the second projection (4d) engages the first projection (4f) from below, whereby the projections (4d, 4f) support each other.

2. Sheet-film cassette according to claim 1, characterized in that the contact areas of the first and the second projection (4d, 4f) have inclined surfaces (4e, 4g) which allow the cassette lid (3) to carry out an unobstructed pivotal movement.

3. Sheet-film cassette according to claim 1 or 2, characterized in that the contact areas (4e, 4g) of the first and second projections (4d, 4f) engage in a light-sealing manner.

4. Sheet-film cassette according to claim 1, characterized in that the hinge (4), which consists of a flexible material, comprises a pivot zone (4i) formed by a thinned section of the material and claw-like holding elements (4a, 4b; 4f, 4h) arranged on either side of said zone and associated with the cassette portions (2, 3).

5. Sheet-film cassette according to claim 4, characterized in that the hinge (4) has a ledge-shaped profile with holding elements (4a, 4b, 4f, 4h) extending in the longitudinal direction, projections (4d, 4f, 4j), inclined surfaces (4e, 4g) and a recess (4k).

6. Sheet-film cassette according to claim 4, characterized in that the claw-like holding elements (4f, 4h; 4a, 4b) engage correspondingly molded structures (2f; 3c) on the lower cassette portion (2) and on the cassette lid (3) respectively.

7. Sheet-film cassette according to claim 4, characterized in that the first projection (4f) is arranged on the holding element (4f, 4h) of hinge (4), which is associated with the lower cassette portion (2), and the second projection (4d) is arranged on the holding element (4a, 4b), which is associated with the cassette lid (3).

8. Sheet-film cassette according to claim 4, characterized in that a third projection (4j) is arranged on the holding element (4f, 4h) associated with the lower cassette portion (2), which third projection covers the first projection (4f) and is arranged parallel therewith and extends further into the interior of the cassette, and in that when cassette (1) is in its closed condition, the third projection (4j) engages in a labyrinth-like fashion an associated recess (4k) in the holding element (4a, 4b) associated with cassette lid (3).

* * * * *